(12) United States Patent
Kiessling

(10) Patent No.: US 6,761,148 B2
(45) Date of Patent: Jul. 13, 2004

(54) ELECTRONIC ROTATION SPEED-DEPENDENT CONTROL AND/OR DIAGNOSIS PROCESS FOR COMBUSTION ENGINES

(75) Inventor: Leo Kiessling, Cadolzburg (DE)

(73) Assignee: Prufrex-Electro-Apparateubau, Inh. Helga Muller, geb Dutschke, Cadolzburg (DE)

( * ) Notice: Subject to any disclaimer, the term of this patent is extended or adjusted under 35 U.S.C. 154(b) by 0 days.

(21) Appl. No.: 10/231,755

(22) Filed: Aug. 29, 2002

(65) Prior Publication Data

US 2003/0056755 A1 Mar. 27, 2003

(30) Foreign Application Priority Data

Sep. 3, 2001 (DE) .......................................... 101 43 001
Jan. 15, 2002 (DE) .......................................... 102 01 422

(51) Int. Cl.$^7$ ................................................. F02P 5/00
(52) U.S. Cl. .............................. 123/406.57; 123/149 D
(58) Field of Search ................... 123/406.57, 406.56, 123/406.58, 406.61, 149 D (56) References Cited

U.S. PATENT DOCUMENTS

| | | | | |
|---|---|---|---|---|
| 4,244,336 A | * | 1/1981 | Fitzner | 123/406.57 |
| 4,398,516 A | * | 8/1983 | Momoyama | 123/406.57 |
| 5,069,193 A | * | 12/1991 | Erhard | 123/335 |

* cited by examiner

Primary Examiner—Bibhu Mohanty
(74) Attorney, Agent, or Firm—Frank H. Foster; Kremblas, Foster, Phillips & Pollick (57) ABSTRACT

An apparatus and process for diagnosis or control of the ignition or load state of a two or four cycle internal combustion engine. A generator rotating synchronously with the engine generates alternating voltages which are scanned by a control and the alternating voltage amplitudes correspond to the rotational speed of the engine. The control detects at least one of the voltage amplitudes each revolution and, based upon the detected amplitude, calculates a control or diagnosis value, sets one or more flags and/or triggers a control event at an ignition control and/or data output.

31 Claims, 10 Drawing Sheets

Circuit diagram according to the invention

Fig. 1

Fig. 2 Circuit diagram according to the invention

Fig. 9
Signals

Fig. 8
Signals

Fig. 13

ELECTRONIC ROTATION SPEED-DEPENDENT CONTROL AND/OR DIAGNOSIS PROCESS FOR COMBUSTION ENGINES The invention relates to a process for rotation speed-dependent control and/or diagnosis of a two- or four-stroke combustion engine, in particular its ignition or load state, using a generator which is rotatable in synchrony with the combustion engine and which as a function of the engine rotation position and speed generates alternating voltages which are scanned by a preferably programmable control and used for its power supply, wherein the amounts of alternating voltage amplitudes correspond to a rotation speed level of the combustion engine or rotatable generator. The invention also relates to a control and/or diagnostic arrangement suitable for performance of this process which has a magnetic generator rotatable in synchrony with the revolutions of the combustion engine and is inductively connected with one or more coils. Depending on the rotation speed and rotary position of the combustion engine, the magnetic generator generates alternating voltages which can be detected by a digital electronic preferably programmable control via a scanning device connected with the one or more coils. Furthermore for its power supply the control is coupled with the one or more coils (L1–L4) (i.e. for example magnetic ignition in contrast to battery ignition) and has one or more output interfaces for control and/or diagnosis signals and/or information. The invention also relates to a computer program suitable for the performance of the features according to the invention.

DE 100 24 391 A1 describes a time control for physical events in combustion engines wherein the relevant event is to be synchronised at least partially as a function of the engine load. One example mentioned of such a synchronising event is the ignition control of the combustion engine as a function of the engine load. But also other applications such as the operation of an external display, fuel injection, control of the fuel-air mixture of the engine, control of exhaust emissions etc. should benefit from load-dependent control signals.

According to DE 100 24 391 A1, on a combustion engine the angular velocity of the crankshaft changes during an engine cycle. The information derived from the change in angular velocity of the crankshaft can be used to determine the engine load for most single-cylinder engines and some multi-cylinder engines. In a single-cylinder four-stroke engine the time between successive engine revolutions is measured, beginning with the start of the combustion cycle. The elapsed time of the revolutions containing the combustion and exhaust strokes is shorter and takes place at a higher rotation speed than the time for the subsequent revolution which contains the intake and compression strokes and takes place at a lower rotation speed.

DE 100 24 391 A1 also proposes the use of a microcontroller to determine the difference between the rotation time with the combustion stroke and that with the compression stroke. The engine load is to be a function of this difference. Alternatively the use of a level-sensitive signal detector is suggested which scans an alternating voltage half-wave block. This checks whether the wave block or cycle at half-waves known per se intersects with or reaches a particular point or threshold value. The time between successive intersections is the time for one engine revolution. In this way various engine revolutions are measured, differentiated and used to determine the engine load.

To determine the engine load of a two-stroke engine, according to DE 100 24 391 following the above principle it is also proposed by means of a microcontroller to detect the time between the passing of thresholds by two directly successive pulses of the same polarity. This time in relation to the complete revolution time is regarded as a function of the engine load.

The object of the invention is, in a control and diagnosis process of the type cited initially, to improve the accuracy of detection and allowance for the current engine state, in particular the angular velocity development over one or more revolutions, and hence increase the reliability and operating safety for engine monitoring and controls, in particular engine ignition controls.

The object is achieved by the process given in claim 1 and the control and/or diagnosis arrangement suitable for its performance according to claim 26 and the computer program. Further advantageous embodiments arise from the dependent claims.

As according to this the absolute value is measured in amount at the peak of the alternating voltage amplitude, a direct conclusion of the momentary angular velocity is possible. If this evaluation takes into account the current associated rotary position of the crankshaft of the combustion engine, a precise picture can reliably be obtained of not only the current rotation speed range but also the engine load. With function modules easily implementable in the electronic controls such as weighting factors, filters, analysis algorithms etc., the momentary angular velocity can be used directly and indirectly as data representing the engine load and information for more reliable setting of the ignition timing or advance angle for engine ignition, fuel injection, control of the fuel-air mixture of the combustion engine and exhaust emissions etc.

A particularly great status change in the two- or four-stroke engines and in particular their angular velocity is expected during the compression stroke. This is countered according to an embodiment of the invention in that the coupling of the magnetic generator with the revolutions of the combustion engine is set such that during or in synchrony with the relevant compression stroke, in the alternating voltage at least one of the amplitudes occurs before the engine piston reaches top dead centre. During this phase an amplitude amount with particularly relevant information on the current engine state can be obtained. With this embodiment it is thus possible also to take into account the "extent" of the angular velocity loss in the compression phase for further control activities including setting the advance angle, which can be achieved without additional hardware complexity.

This is achieved with the general inventive concept of detecting as an amount the peak voltage of an alternating voltage induced by a rotary magnet wheel of the magnetic generator, for example in coils, and from this concluding the momentary angular velocity. As is known, the peak voltage has a fixed functional correlation with the momentary angular velocity of the magnet wheel.

In order to be able to classify better the angular velocity losses to be expected in the compression cycle in the context of the general engine state, according to a further refinement of the process it is proposed within each engine revolution to determine a mean angular velocity in a manner known per se (see e.g. U.S. Pat. No. 4,924,831, U.S. Pat. No. 5,392,753) by measurement of a duration required for the combustion engine to pass through a particular predetermined reference rotary angle (preferably at least 150° of a full revolution). From this information can be obtained on the engine load or volume. As the volume or load increases, in relation to a common rotation speed range, the mean and current momentary angular velocity drift correspondingly further apart; an angular velocity loss is always greater as the volume or load increases, in particular in the compression stroke, immediately before top dead centre. This information can also be used by an electronic control for load-dependent advance angle adjustment or curve reversal, or load-dependent control of other actuators e.g. valves in the carburettor to influence the mixture. With four-stroke combustion engines, alternatively, differences in the peak or amplitude values of the alternating voltage half-waves occurring firstly in the exhaust stroke and secondly in the subsequent working stroke can be calculated alternately and analysed to obtain load information.

It is within the scope of the invention to detect the momentary angular velocity shortly before reaching the rotary or angular position of the magnetic generator wheel in the upper, middle or preferably in the lower rotation speed range, and to determine or readjust the ignition timing subsequently on the basis of this momentary angular velocity value. Thus an optimised advance angle can be determined, preferably in conjunction with preprogrammed advance angle/rotation speed tables, largely unaffected or undistorted by an angular velocity loss above all in the compression phase. A refinement of the general inventive concept lies in particular in that, shortly before reaching the top dead centre where the momentary angular velocity of the compression phase naturally diminishes more or less, this angular velocity loss is detected momentarily and used to adjust the ignition timing. Thus also the requirement for smooth starting of the combustion engine with minimum rotation speed can be taken into account. With the invention namely the advantage can be achieved that easier starting is possible, in particular with small combustion engines. At the same time the user has greater protection against kickback (engine recoil due to over-advanced timing).

Further features, details, advantages and effects based on the invention arise from the dependent claims and the subsequent description of preferred embodiments of the invention and the drawings. These show:

FIG. 1 a partially cut-away front view of a magnetic generator with magnet wheel and coil arrangement which can be used for the invention, FIG. 2 a block circuit diagram of the invention, FIG. 3 an advance angle/rotation speed diagram, FIG. 4 a diagram of an alternating voltage amplitude or peak voltage as a function of rotation speed, FIG. 5 an angular velocity development of a combustion engine on manual start shown over the rotary angle covering several revolutions, FIG. 6 a section of the engine angular velocity development over the rotary angle in different states of the combustion engine, FIG. 7 further angular velocity developments shown similar to FIG. 6 over the engine rotary angle, FIGS. 8 and 9 various voltage signal developments over the engine rotary angle, FIGS. 10 to 13 flow diagrams for the program procedures implemented in the electronic control based on the invention.

Figure 1:
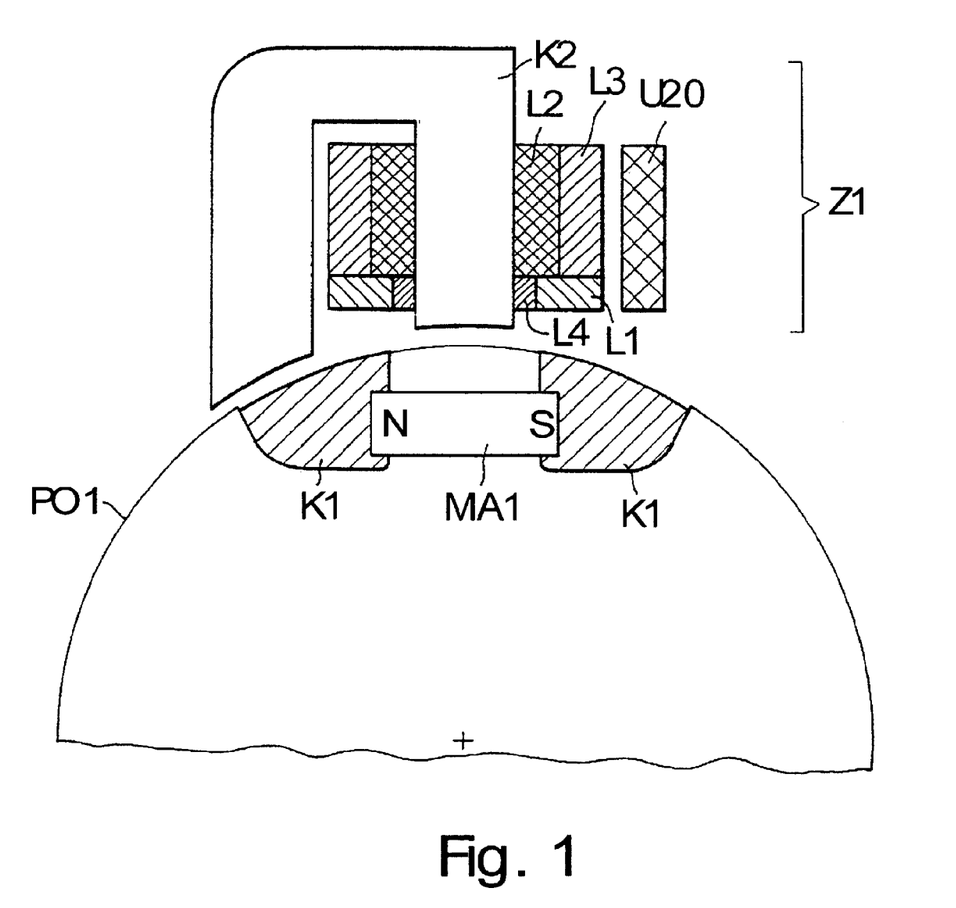
Figure 8:
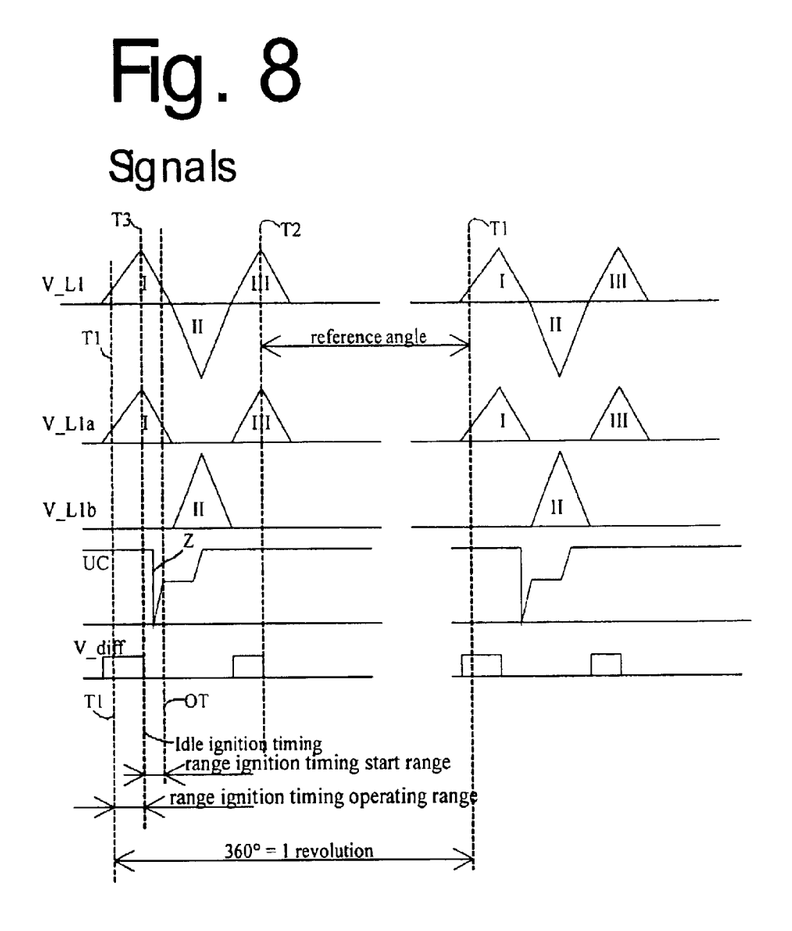

According to FIG. 1 a magnet wheel P01 revolves rotationally fixed with a crankshaft (not shown) of a combustion engine and has on its peripheral section a permanent magnet MA1 with magnetic poles N, S. These are each surrounded by a pole shoe K1 which each extend to the peripheral edge of magnet wheel P01. An ignition module Z1 with coils L1, L2, L3, L4 which extend about the iron core K2 is arranged opposite the magnet wheel P01 such that at a particular rotary position as shown in FIG. 1 an electromagnetic induction can take place in the coils, starting from the passing permanent magnet MA1. Here the iron core K2 is flooded by an alternating magnetic flux so that in the coils L1–L4, in each revolution in synchrony with the angular position of the magnet wheel, the half-wave cycle I, II, III is induced as shown in FIG. 8.

Figure 2:
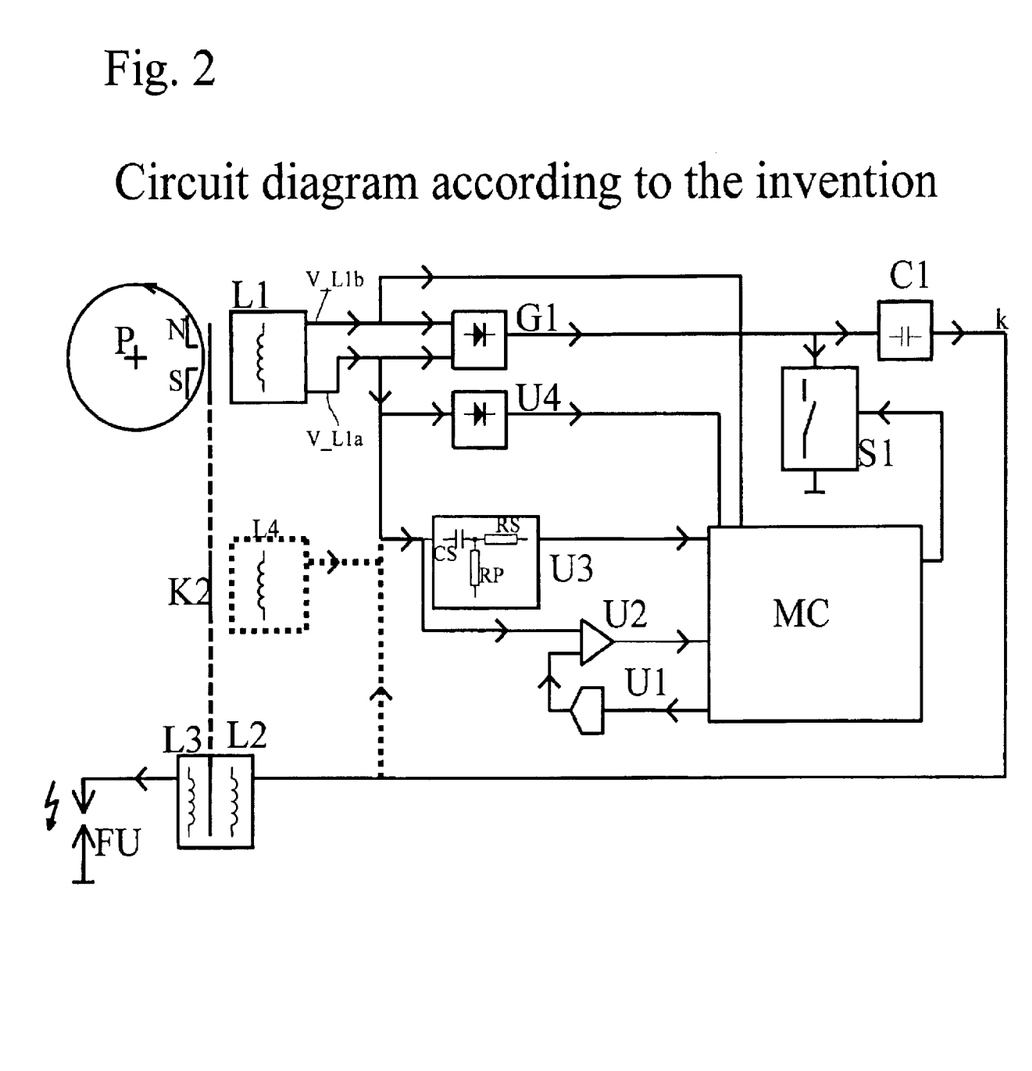

According to FIG. 2, from the voltage V_L1 induced in the charge coil L1 via a bridge rectifier G1, with each revolution an ignition capacitor C1 is charged to a capacitor voltage UC for storage of ignition energy. When switch element Si is closed by a programmable electronic control, for example a microcontroller MC, the capacitor C1 can discharge via the primary coil L2 of an ignition transmitter L2, L3, to provoke an ignition spark FU in the cylinder of the combustion engine (see also falling flank Z of capacitor voltage UC in FIG. 8). Through a winding ratio of the secondary coil L3 to primary coil L2 of around 100, at the secondary coil L3 of the ignition transmitter L2, L3 an amplitude of a few thousand Volt can be achieved whereby a spark jumps at the spark gap FU of a spark plug to ignite the fuel mixture in the combustion chamber of the combustion engine. As already mentioned the switch element S1, for example a thyristor, is activated by microcontroller MC as an electronic control. Its voltage is supplied from a second rectifier U4 which is supplied from a charge coil L1 in the same way as the first rectifier G1. Information on the rotary position of the crankshaft or magnet wheel P of the combustion engine is obtained by the microcontroller from the alternating voltage V_L1 of the charge coil L1 via corresponding terminals V_L1a, V_L1b. As is clear also from FIG. 8, the passage of the magnet wheel P01 past ignition module Z1 causes a cycle of three half-waves I, II, III (see also FIG. 8). The first half-wave I and the third half-wave III of positive polarity on one side, and the second half-wave II of negative polarity on the other, are available at separate terminals as separate signals V_L1a or V_L1b. The half-wave II is also supplied to the microcontroller as signal V_L1b where applicable via an adaptation circuit for synchronisation with the magnet wheel revolutions.

The second signal V_L1a which supplies the half-waves I and III of positive polarity is supplied to the microcontroller indirectly via an RC differential element U3 with passive components CS, RS, RP. The differential effect allows a computer program running in the microcontroller MC to react to extreme positions or peaks of alternating voltage V_L1 and hence obtain information on the timings or angle positions T3, T2 (see FIG. 8) at which the peak values or amplitudes of the alternating voltage half-waves I and III occur. The approximately rectangular output signal V_diff results from the connection of the output terminals of the differential element U3 with internal terminal diodes of the microcontroller at its inputs allocated to the differential element. In ignition systems with flatter signal amplitudes it may be suitable to connect active signal formers e.g. a transistor stage in emitter circuits after the differential element U3, and then supply the output signal of this emitter follower to the microcontroller MC.

According to FIG. 2 the microcontroller MC is still externally connected with an analog-digital converter U2, U1, the input of which is connected directly with the output terminal or alternating voltage signal V_L1a. The converter can be implemented with weighing processes known per se i.e. a comparator U2 compares the alternating voltage detected at coil L1 with the output voltage of a digital-analog converter U1, the digital input value of which is set by an output interface of the microcontroller successively until a measurement value is achieved which is reported to the microcontroller MC through the output of comparator U2.

According to an advantageous embodiment of the invention the differential element U3 shown in FIG. 2 can be omitted. In order however to still be able to detect the angle positions T3 and T2 according to FIG. 8, the microcontroller MC is programmed so that while waiting for these angle positions T3, T2, by means of the analog-digital conversion by the digital-analog converter U1 and the comparator U2 detecting its output, the amplitude of load-coil signal V_L1a is continuously scanned. As soon as a voltage value with falling tendency is established, i.e. the actual scanned value is less than its predecessor, the preceding higher scanned value is taken as a peak value or amplitude amount. This is possible with sufficient accuracy in particular if this process is used in the lower rotation speed range, because the digital-analog converter can adjust to a stable analog output value within one to a few microseconds. To achieve insensitivity to interference peaks and save on corresponding hardware filters, it is further proposed to accept a scanned value as a peak value only when two or more successive scanned values are lower than the first peak value.

Figure 6:
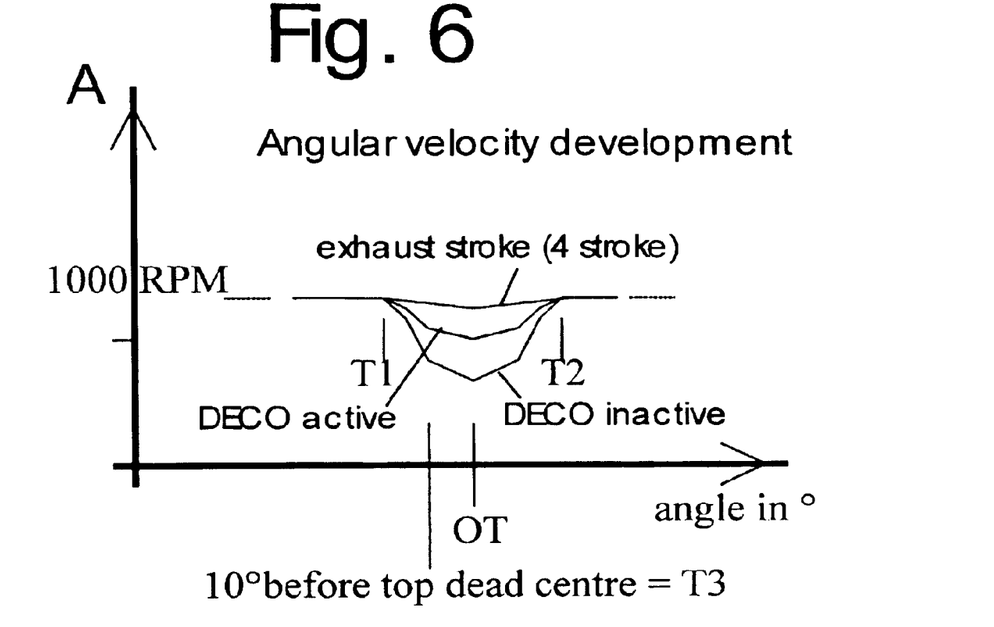

According to an advantageous embodiment the digital-analog converter U1 and the comparator U2 co-operating with this are integrated with microcontroller MC into a common module such as is already available commercially by the manufacturer Microchip Technology Inc. under reference 16F628. Alternatively the digital-analog converter in conjunction with microcontroller chips without such integral modules can also be implemented at low cost by a programmable voltage divider consisting of a resistance chain at IC port connections. For further details reference is made to the older German patent application 101 55 484.2, in particular FIG. 6 by the same Applicant, which was submitted to the German Patent and Trademark Office on 13.11.2001.

According to an alternative embodiment of the invention the reference voltage for comparator U2 can also be fixed, for example by a voltage divider (not shown) between the supply voltage for the microcontroller MC according to FIG. 2 and earth. Then the charge coil signal V_L1a can be supplied as a voltage via a programmable voltage divider to the comparator U2 wherein different base impedances of the voltage divider can be earthed via tri-state ports of the microcontroller IC's.

FIG. 2 also shows in dotted lines that the power supply and/or the coil signals to be processed can be detected by other coils which surround the old core K2. For example the alternating voltage half-waves I, II, III can be derived from primary coil L2 or an auxiliary coil L4 (shown dotted in FIG. 2). The power supply circuit U4 and coupling voltage dividers (not shown) are to be adapted to the corresponding level.

Figure 3:
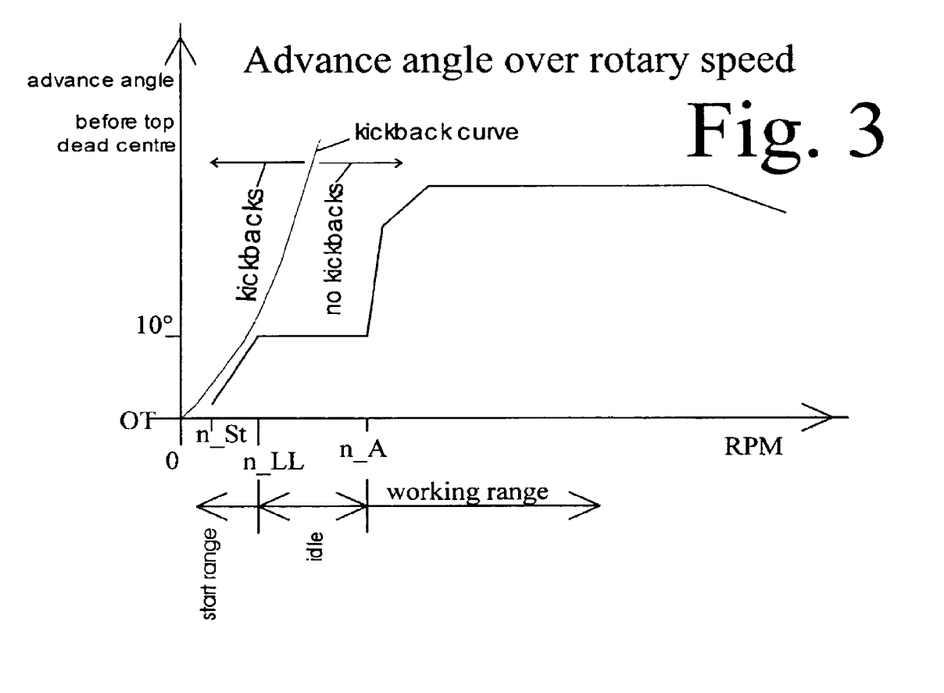

As known per se and shown in FIG. 3, ignition systems are provided with ignition control in order to achieve optimum combustion and good operating behaviour as a function of the operating state of the combustion engine. Preprogrammable ignition control, as precise as possible, is ensured by digital control systems for example in the form of customer-specific hardwired circuits or freely programmable controls (cf. microcontroller MC in FIG. 2). As known per se, the control system during each revolution measures the time between two angle marks (see "reference angle" in FIG. 8). On the basis of this time measurement which corresponds to a mean angular velocity or rotation speed RPM, using an adjustment curve stored in table form according to FIG. 3, the control system calculates or determines the adjustment or delay time which the crankshaft requires from a particular angle mark in order to reach an advance angle preprogrammed according to the adjustment curve (FIG. 3). This delay time counting starts from this angle mark and proceeds until a predetermined figure is reached, then the ignition process is triggered by the control electronics. Examples are given in sources U.S. Pat. No. 5,392,753, U.S. Pat. No. 4,924,831, U.S. Pat. No. 5,050,553, U.S. Pat. No. 6,216,669 and DE 197 36 032.

In modern engines with low flywheel mass and high compression however there is a problem that in the lower rotation speed ranges the angular velocity fluctuates greatly. For example in the compression stroke about top dead centre OT, because of the compression pressure acting on the piston base, it can fall to one-quarter of the angular velocity at bottom dead centre.

According to FIG. 3 at low rotation speeds the ignition timing or advance angle lies close to top dead centre. Therefore according to FIG. 5 with angular velocity loss d, in the fourth revolution in the area of the top dead centre OT there is already a considerable time delay for the coming ignition trigger. This loss varies as a function of further operating parameters e.g. temperature, rotation speed (kinetic energy stored in the magnet wheel increases with the rotation speed), response behaviour at the start, instability, volume or engine load, friction and position of any decompression valve DECO. In the processes previously known for advance angle adjustment, the disadvantage occurs that at most only one prespecified "typical" standard angular velocity loss is taken into account when defining the delay time in a table according to FIG. 3. Actually however great variations in the angular velocity development and loss are typical, which when an assumed standard graph is applied, for an angular velocity loss in the compression phase can lead to inaccuracies in determining the advance angle.

According to FIG. 3 as the rotation speeds fall the ignition takes place relatively late i.e. close to top dead centre OT, which corresponds to a relatively "late" advance setting of the advanceangle. Furthermore the lowest angular velocity within one rotation also lies in the area immediately before top dead centre OT, whereby an incorrect setting of the actual advance angle due to the angular velocity loss d becomes evident despite the use of a table according to FIG. 3. With an even greater angular velocity loss b according to FIG. 5 in comparison with the smaller angular velocity loss a, the error would arise of a physically even earlier advance angle in comparison with that preprogrammed in a table according to FIG. 3, as with the delay time precalculated accordingly, the crankshaft has actually covered only a smaller angle. The disadvantage arises that even before reaching top dead centre, the compression repels the piston in the direction of bottom dead centre UT, i.e. the combustion engine reverses its direction of rotation (cf. kickback c in FIG. 5). This may be associated with a risk of injury for the user during starting with a starter cable when the combustion engine is used in small machines. However for good starting behaviour it is of advantage in particular for small engines to place the ignition timing as close as possible to the kickback curve shown in dotted lines in FIG. 3; the earlier the ignition timing, the better the high speed behaviour of the engine. The closer however the advance angle curve according to FIG. 3 lies to the kickback curve shown there, the greater is the risk or probability of kickback or a reversal of the rotation direction of the engine.

To remedy this, according to a refinement of the invention it is proposed that where the probability of angular velocity fluctuations is greatest (in practice this is often at 10° before top dead centre), to supply an actual value via the momentary angular velocity from the said peak or amplitude measurement and use this as an argument for determining or adjusting the next ignition timing. The detection of the angular velocity loss is the more informative, the closer it takes place to the top dead centre OT. Therefore in the rotation speed start range according to FIG. 3, the aim is to make detection as close as possible before the possible ignition timing. However the ignition timing can only be determined from detection of the angular velocity. Under these circumstances according to FIG. 3, 10° before top dead centre (on or before the earliest ignition timing in the start or idle range) is suitable.

If the actual physical ignition timing (in contrast to the "logic" ignition timing stored in the table) however fluctuates greatly because of the differently occurring angular velocity loss in the compression stroke, a correspondingly larger safety interval from the kickback curve is advisable. Furthermore the minimum rotation speed for smooth starting or high speed running must be set relatively high. In the idle rotation speed range shown in FIG. 3 also fluctuations in engine volume or load due to correspondingly fluctuating angular velocity losses affect the actual ignition timing or advance angle, disrupting the idling stability of the engine.

Figure 4:
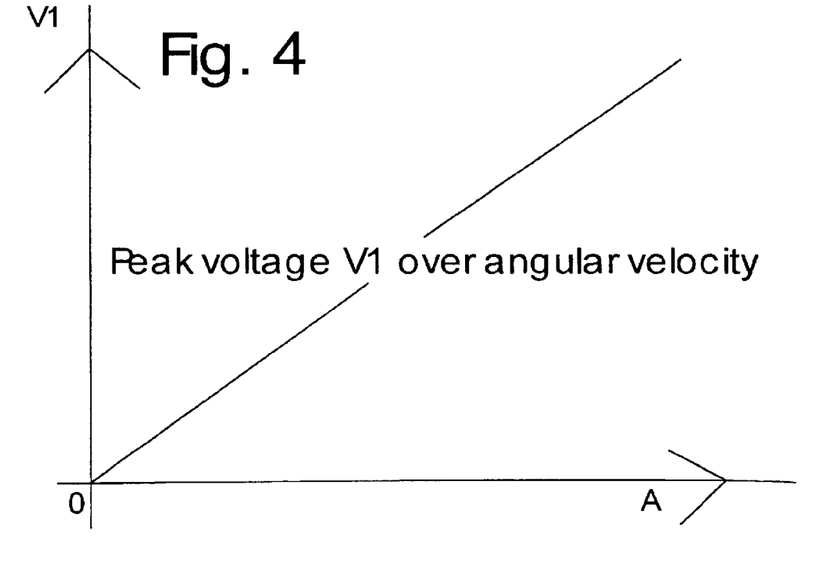

According to the inventive concept this is remedied in that at the time or the rotary angle position T3 according to FIG. 8, i.e. close to the advance angle or ignition timing Z, the momentary angular velocity of the magnet wheel over the absolute value of peak voltage U1 of the alternating voltage half-wave 1 is detected at load coil L1. The absolute value of the amplitude peak voltage V1 can serve as a basis for calculating the ignition timing adjustment, in particular (but not only) in the lower rotation speed range. According to FIG. 4 in a simple, functional, namely linear correlation of the peak voltage V1, the momentary angular velocity W can be concluded. Thus via the voltage/angular velocity function according to FIG. 4 in combination with a pre-specified table or curve according to FIG. 3, an advance of the advance angle adjustment can be allocated to the value of the detected peak voltage V1.

As is known per se the magnet wheel P01 is attached at fixed angle via a keyway on the crankshaft of the combustion engine. The revolutions are mechanically rigidly coupled with the reciprocating motion of the piston. Depending on the angle position or angular offset of the keyway, the occurrence of peak voltages of a half-wave cycle I–III of the induced alternating voltage can be set or synchronised in time and angle within a revolution. As part of the invention a suitable angular geometric setting of the relation magnet wheel-keyway-crankshaft is such that the amplitude of the first half-wave I generated in the ignition module lies close to the top dead centre OT of the piston, for example 15–10° before top dead centre. This angle position is marked in FIG. 8 with T3, which at the same time in the rotation speed start range according to FIG. 3 marks the earliest ignition timing or advance angle which can be programmed according to the example in the invention. In the practical trial an area up to approx. 15° before top dead centre has proved useful. Here it is advantageous that according to FIG. 6 the angular velocity loss flattens out again about top dead centre.

Figure 5:
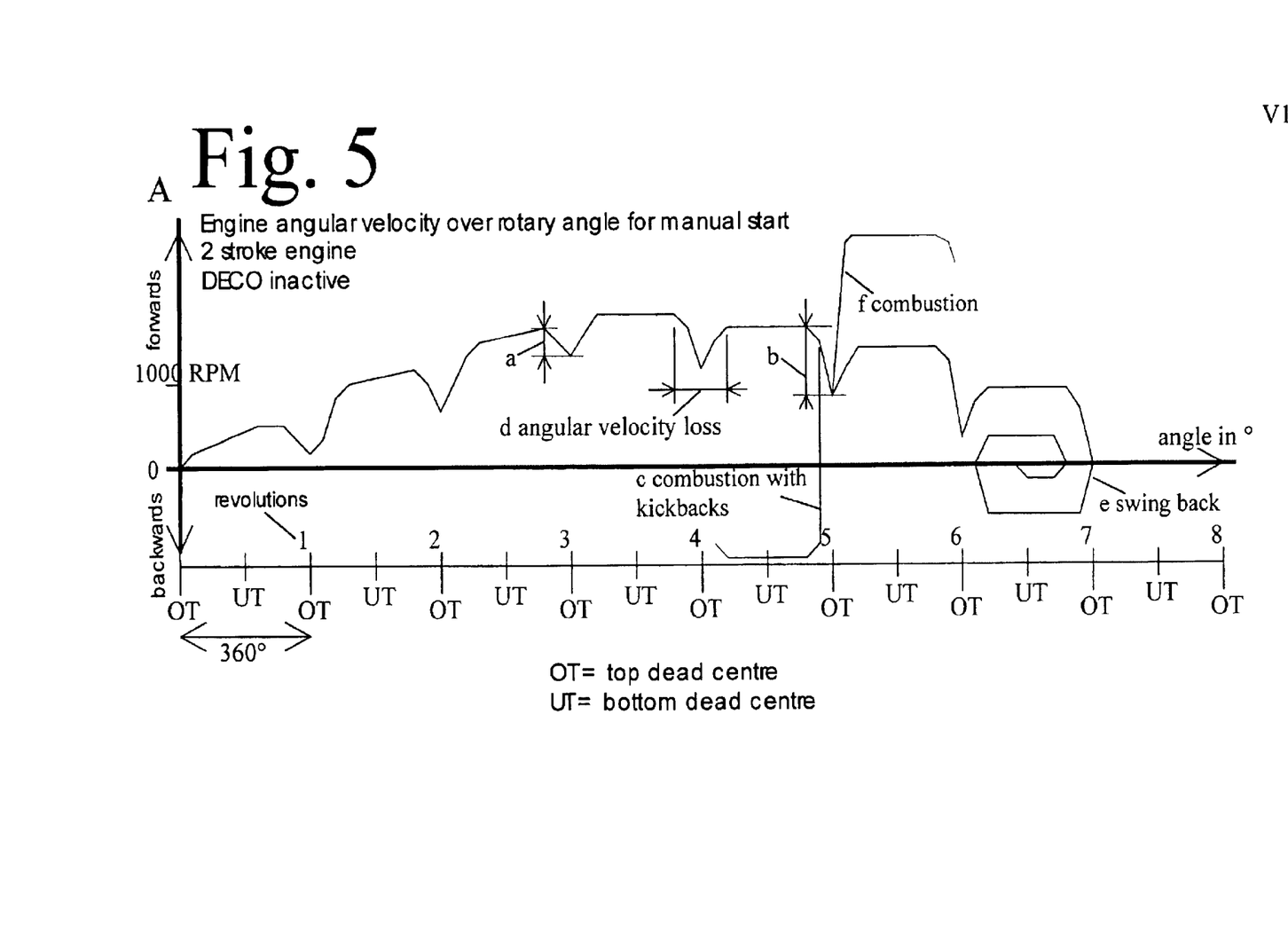

At too low a momentary angular velocity or peak voltage or amplitude amount, no ignition process may be triggered as the engine could kickback or reverse its direction of rotation. For very low momentary angular velocities or particularly drastic losses, the angular velocity even after the peak voltage time T3 diminishes so greatly that the crankshaft or engine piston coupled to this cannot pass its top dead centre OT but swings back, as is indicated with reference e in FIG. 5 in revolution 7. This can be countered by the early analog detection according to the invention of the absolute amount of the first alternating voltage amplitude V1 per revolution. If the computer program running for example in microcontroller MC consequently finds too low a momentary angular velocity W, the triggering of an ignition event FU is excluded by the program in the microcontroller MC. Thus according to the invention the program in the microcontroller MC at the seventh revolution according to FIG. 5 gives no ignition signal, in order not to support a change in rotation direction by the engine close to top dead centre OT and allow instability. If in the seventh revolution according to FIG. 5 an ignition process is triggered despite the swing back e shown there, the fuel mixture in the engine cylinder could combust and accelerate the engine greatly in the reverse or backward direction.

FIG. 5 shows the development of angular velocity over a plurality of engine revolutions OT, UT, OT . . . shown for manual start with a traction cable. In the first three revolutions 1, 2, 3 by the supply of a torque by the operator via the traction cable, the angular velocity loss shortly before top dead centre is kept smaller than in the subsequent revolutions 4, 5, 6. This is shown by a comparison of the smaller loss a in the third revolution with the greater loss b in the revolution, although the two revolutions have an approximately corresponding mean angular velocity RPM. For an advance angle adjustment made correctly using the actual momentary angular velocity W determined, combustion f occurs without kickback, whereas in contrast for too early an ignition timing or advance angle, combustion c with kickback would result.

The use of a decompression valve DECO is known per se in order to reduce compression pressure in the cylinder of a combustion engine by leakage. In the start process the decompression valve must be activated by the operator to facilitate the start process and increase operating reliability. Due to the leakage the compression is reduced and the start temperature lowered. So on starting for example when pulling the starter cable the user requires less force to trigger a start process. When the engine has reached its continuous permanent running, the decompression valve is inactivated or closed automatically.

Figure 7:
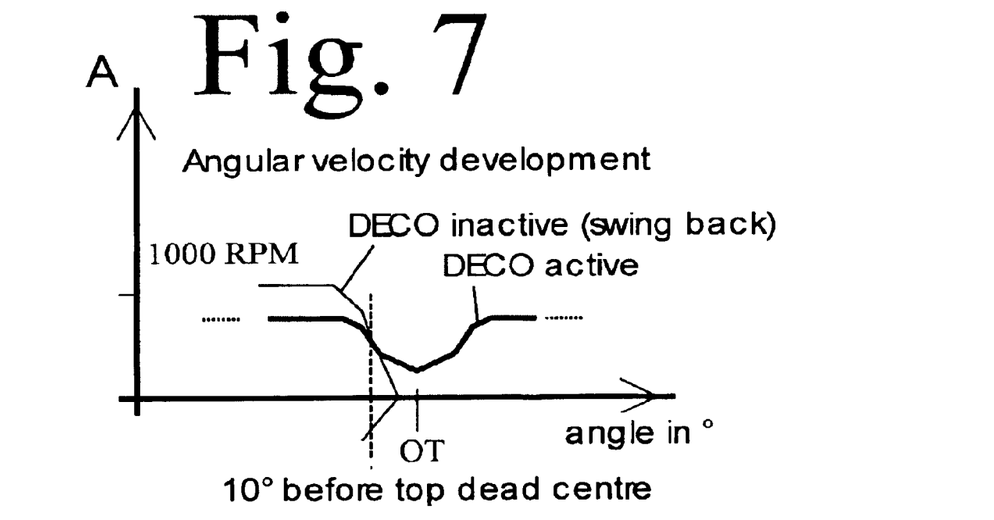

On this basis according to an embodiment of the invention it is suitable, in an engine cylinder, to distinguish the state "decompression valve active" from "decompression valve inactive". According to FIG. 7 corresponding angular velocities are still achieved (see intersection of thick and thin curves) around 10 angle degrees before top dead centre in both operating modes (DECO inactive and active). In mode "DECO inactive" however kickback or reversal of rotation direction occurs so that further ignition must be excluded. This is not the case in mode "DECO active". When the ignition is triggered the piston of the engine can still pass top dead centre because sufficient kinetic energy is still stored in the crankshaft. By comparing the mean angular velocity RPM (measured for example via reference angle T2–T1 given in FIG. 8 using the time counting method known per se) with the momentary angular velocity determined at the time or rotary angle T3 by measurement of peak voltage V1, information is obtained of the extent of angular velocity loss. For evaluation, for example the ratio of momentary angular velocity to mean angular velocity can be calculated. If this is approximately one there is no loss, if the deviation from one is great there is a corresponding loss of angular velocity.

If the ratio of momentary angular velocity to mean angular velocity moves towards one, as part of the invention an advance of the ignition timing ZZP (see e.g. FIG. 9) is shown. Only a slight angular velocity loss is present, so that at the same time the ignition timing can be triggered or advanced. Conversely, if the said ratio is substantially less than one, the ignition timing ZZP is retarded.

Using the angular velocity loss, in a four-stroke combustion engine the exhaust stroke can be distinguished from the compression stroke as the exhaust stroke causes only a slight angular velocity loss in comparison with the compression stroke. The microcontroller MC can be programmed accordingly for this distinction. If the software establishes that no angular velocity loss occurs when passing through the top dead centre OT, an exhaust stroke is to be concluded and the output of an ignition signal to be omitted. This allows the energy of two crankshaft revolutions to be stored in the ignition capacitor C1 according to FIG. 2. The generation of a parasitic or redundant ignition spark and/or corresponding energy wastage is suppressed. If on further revolution the microcontroller software identifies a compression stroke with great angular velocity loss in the area of top dead centre OT, now an ignition process is triggered which is characterised by increased power because of the "double charging" of the ignition capacitor C1 over two revolutions without discharge in the exhaust stroke revolution. In a further embodiment with the recognition of the angular velocity loss according to the invention it is also conceivable that after identification of the combustion engine cycles and distinction of the compression stroke from other strokes, the microcontroller can itself count the revolutions and identify the corresponding engine strokes. This is advantageous in particular at higher rotation speeds where naturally the angular velocity loss is less and hence metrological distinction would be possible only with greater hardware complexity, in particular a more precise analog-digital converter. In contrast on the basis of counting after initial measurement of the angular velocity loss, and recognition of the strokes, it is possible later to allocate rotary phases within a revolution to the individual strokes of the combustion engine.

According to a further embodiment of the invention in connection with four-stroke combustion engines, the momentary angular velocities of two successive revolutions firstly with exhaust stroke and secondly with working stroke are compared to obtain load information. On both revolutions the peak voltage of the respective third half-wave III according to FIG. 8 is measured at the time or in the angle position T2 via analog-digital converters by microcontroller software. Time T2 according to FIG. 8 can lie in one revolution in the exhaust phase and in the following revolution (360° later) in the combustion phase, wherein both phases lie approximately 60° after top dead centre of the cylinder piston. This is however only an example depending on dimensions and other properties of the iron core and magnet system. As the load increases the momentary angular velocities W of two successive revolutions at time T2 move apart in each case, from which diagnostic information on the state of the engine and in particular its load can be obtained. Thus it can be concluded from this that at high engine load the throttle valve also is opened wide so that plenty of combustion mixture reaches the combustion chamber of the cylinder, and in the working stroke the piston is subjected to great acceleration. The ratio of the two momentary angular velocities W at the relevant time or angle position T2 according to FIG. 8 is thus a function of the engine load. It should also be taken into account that under the same load but with a decreasing rotation speed, the momentary angular velocities can also move apart as each crankshaft revolution now takes more time and the kinetic energy stored in the rotating mass of the crankshaft and magnet wheel diminishes. We must then proceed as in the evaluation of the angular velocity loss during the compression stroke at time or angle position T1 or T3 according to FIG. 8.

The air gap shown in FIG. 1 between magnet wheel P01 and coil arrangement L1–L4 with surrounding iron core K2 can vary, as can the strength of the permanent magnet MA1. This naturally has a disruptive effect on the amplitude amount or peak voltage of the induced alternating voltage I to III and the momentary angular velocity derived therefrom. To compensate according to one embodiment of the invention it is proposed to compare the momentary angular velocity W derived from the amplitude amount of the second positive half-wave III at time or angle position T2 with the mean angular velocity RPM which is obtained by digital counting via reference angle T2–T1 according to FIG. 8. The reference angle T2–T1 is in the rotation phase where no angular velocity loss occurs. Consequently in this range the momentary and mean angular velocities correspond. From their comparison a correction factor can be determined, for example, as the ratio is formed of the momentary angular velocity W at time T2 to the mean angular velocity RPM averaged over reference angle T2–T1. Via this ratio value the measured amount of the peak value V1 of the first half-wave I can be corrected which occurs at time or angle position T3 according to FIG. 8.

One advantage which can be achieved with the process according to the invention is also that from the start of the first positive half-wave I to the occurrence of the maximum or peak voltage V1, almost no energy is drawn from the coils of the ignition system. Thus the physical function correlation shown in FIG. 4 between the momentary angular velocity and the peak voltage to the first half-wave 1 is largely unaffected.

FIGS. 10–13 show the function of an example computer program which could be implemented for the process according to the invention in microcontroller MC.

Figure 9:
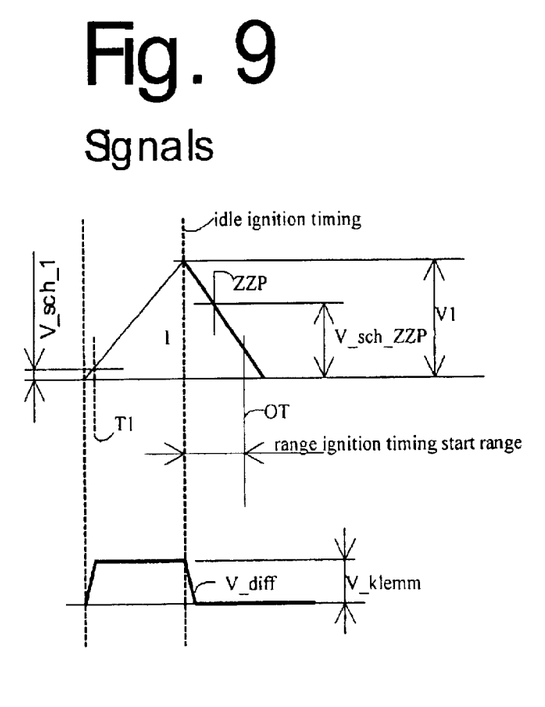
Figure 10:
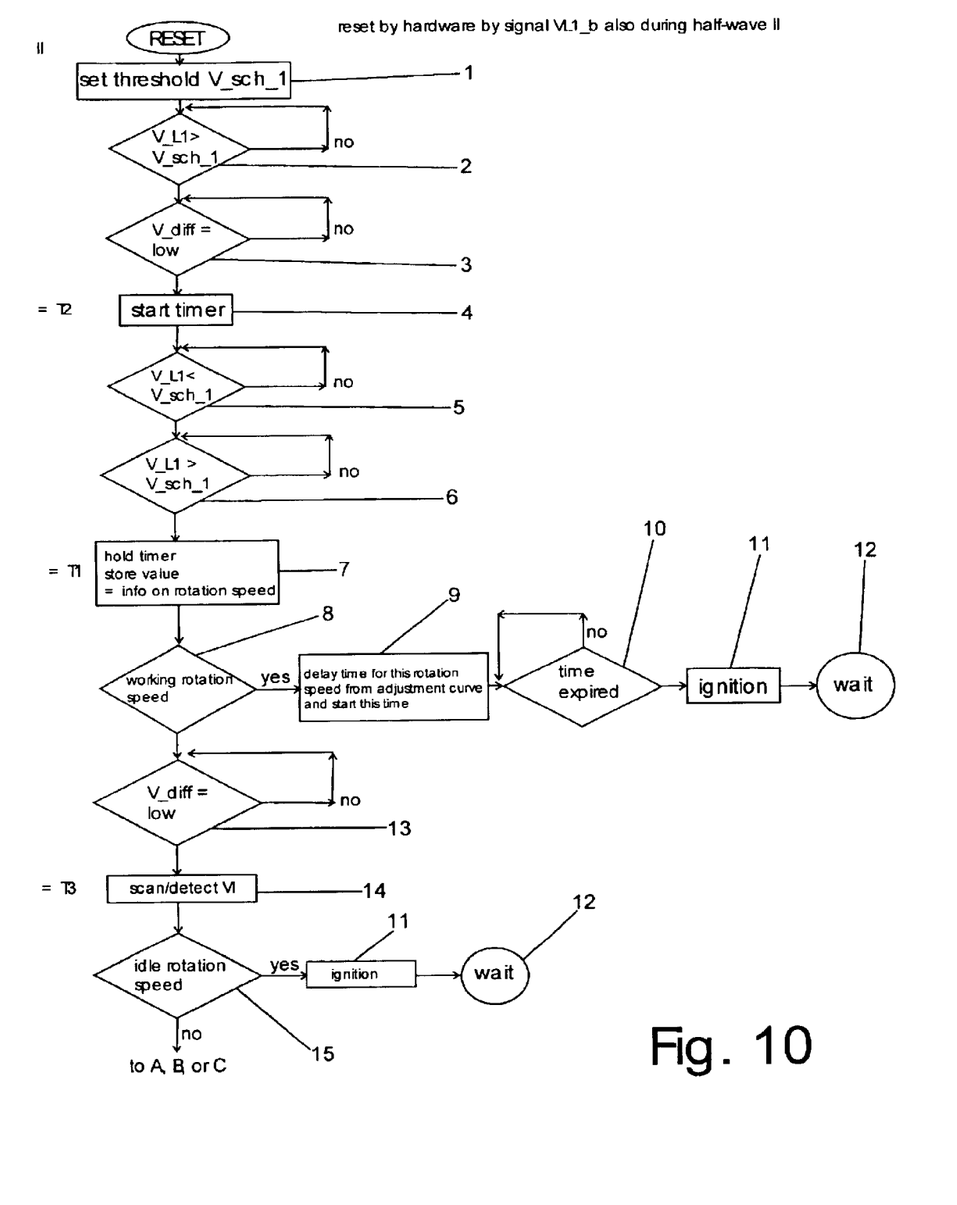

According to FIG. 10 the program start in the microcontroller MC takes place via hardware reset. For this according to FIG. 2 the load coil signal V__L1b which contains the respective second half-wave II of negative polarity of a revolution alternating voltage, is supplied to a corresponding reset or interrupt input of the microcontroller MC. Then by means of program sequences or modules 1, 2 after the end of the second negative half-wave II, comparator U2 (see FIG. 2) scans the load coil signal V__L1a at which are present the first and third alternating voltage half-waves I, III each of positive polarity. By means of the digital-analog converter U1 the microcontroller MC in comparator U2 then sets the threshold to the level V__Sch__1 according to FIG. 9 and then monitors the output of comparator U2. Threshold level V__Sch__1 is designed so that it is exceeded by half-wave I of the coil signal V__L1a in the working rotation speed range before the advance angle programmed for the earliest time within a revolution. According to FIG. 10 this is implemented by the sequential program element 1 and the program branch 2 (waiting loop for levels of the third positive half-wave III). A program branch 3 (waiting loop for peak value of third positive half-wave III) detects when the third half-wave III of the load coil signal V__L1 has reached its amplitude or peak value in time or angle T2. The differential element U3 signals this to microcontroller MC by a falling flank in its output signal V__diff. A counter program element 4 and hence a timer internal to the microcontroller is then started which for example adds internally generated, equidistant counting pulses (for example at intervals of one microsecond). By means of a program branch 5 (waiting loop for undershoot) and a program 6 (waiting loop for overshoot), the counting process of the timer is maintained until the charge coil signal at time or rotary angle T1 (see FIG. 9) exceeds the threshold V_sch_1 previously set in the program element 1. If the third and fourth program branches 5, 6 detect the overshoot of the threshold V_sch_1 set in the programming sequence 1, which according to FIG. 9 takes place at time or rotary angle T1, the timer is stopped within the program. The counter time period of the timer corresponds to the reference angle shown in FIG. 8 between revolution angles T2 and T1. From the counter result in the timer gives information on the time which the crankshaft of the combustion engine required to cover the reference angle. From this the microcomputer obtains information on the engine or engine rotation speed which corresponds to the mean angular velocity RPM. The data processing necessary for this is achieved by means of sequential program element 7. A program branch 8 then checks whether the mean angular velocity or rotation speed lies within a predetermined working rotation speed. If so, using a prestored table in the microcontroller MC which corresponds to the curve in FIG. 3, the allocated delay time is read (sequential program element 9) and after its expiry (waiting loop with program branch 10) the ignition process triggered (sequential program element 11—ignition routine). This puts the microcontroller in a state 12 of waiting for a new hardware reset from the second half-wave II of negative polarity.

At rotation speeds below the working speed range—which is determined via program branch 8—a subsequent program branch 13 initiates a waiting loop until the differential element U3 signals to the microcontroller MC with signal V_diff with falling flank that the amplitude or peak value V1 of the first positive half-wave I has been reached and is diminishing again. This corresponds to the angle position or time T3 within a revolution in which by means of the sequential program code element 14 a software routine is executed to scan and detect the amount of the peak or amplitude voltage of the first half-wave I. A program branch 15, using a table stored previously in the microcontroller in accordance with the curve in FIG. 4, establishes whether the peak or amplitude value of the alternating voltage half-wave I or the momentary angular velocity W allocated according to FIG. 4 falls in an idle rotation speed range. If so, the said ignition routine according to program element 11 is executed immediately and the waiting mode 12 then initiated.

According to an adjustment curve shown in FIG. 3, in the idle rotation speed range the adjustment curve runs horizontal at a revolution angle position of 10° before top dead centre. As discussed above it is suitable to arrange the magnet wheel P01 on the crankshaft via a keyway device known per se with an angular geometry such that the peak value or amplitude of the first half-wave I of the charge coil signal V_L1a occurs at the time or revolution angle 10° before top dead centre. In this way the idle rotation speed range according to FIG. 3 can be implemented with the software branch 15, 11, 12 explained above.

The analog value of the charged coil signal V_L1a is detected by a measurement program routine in the program element 14 in that the microcontroller MC via its output to the digital-analog converter U1 increases the threshold value for comparator U2 in steps or successively until comparator U2 switches. As the peak voltage according to FIG. 4 rises with the increase in momentary angular velocity, the microcontroller via the measurement software contained in program element 14 can calculate information on the momentary angular velocity in angle position T3.

In accordance with the section "start area" in FIG. 3, in the microcontroller MC is first stored in table form a curve "advance angle or delay time over momentary angular velocity" for this lowest rotation speed range. According to FIG. 11 a program branch 16 checks whether the momentary angular velocity W determined by analog-digital conversion or the corresponding amplitude or peak voltage V1 corresponds to a rotation speed range above 600 revolutions per minute. If not ignition is omitted, otherwise the delay time allocated to the respective momentary angular velocity is read from the adjustment curve table according to FIG. 3 and by means of a wake-up function internal to the software a corresponding waiting time is started (sequential program element 17). After a preset time a waiting loop implemented with program branch 18 establishes the expiry of the waiting time and again the said ignition routine 11 is started with subsequent shift into waiting mode 12. The ignition routine 11 contains in particular the output of a switch trigger signal for the discharge switch S1 according to FIG. 2.

Figure 12:
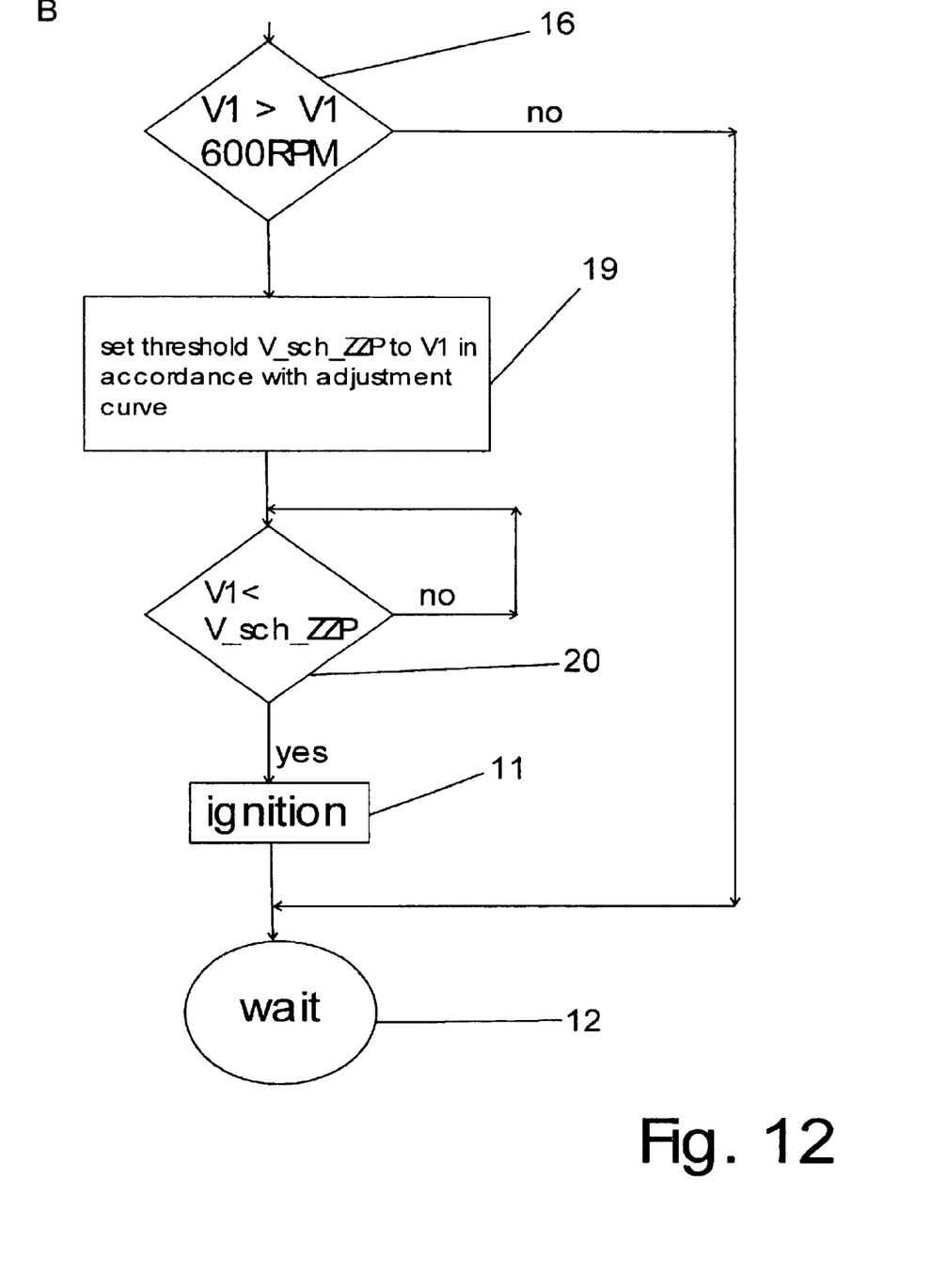

With the alternative in FIG. 12 it is proposed to implement the ignition timing adjustment for the starting rotation speed range from the establishment of the momentary angular velocity at angle position T3 instead of from a delay time, via a programmable voltage threshold V_sch_ZZP according to FIG. 9. After the aforementioned scan or program branch 16 concerning a rotation speed threshold of 600 revolutions per minute, if there is no undershoot of the rotation speed threshold, in accordance with sequential program element 19 from an adjustment curve stored in the microcontroller in table form in a similar manner to FIG. 3, a threshold value V_sch_ZZP is read which is allocated to the momentary angular velocity or peak voltage detected in program element 14. Via the digital-analog converter U1 the microcontroller MC sets the comparator U2 to this threshold in good time so that the falling flank of the first positive alternating voltage half-wave I can still undershoot this threshold. The ignition process ZZP is triggered by output of a corresponding signal to switch S1 when the coil signal V_L1a undershoots this threshold and a corresponding switch signal is given by comparator U2 to the microcontroller MC. The microcontroller software has a further program branch element 20 for this scan. On undershoot of threshold V_sch_ZZP, the ignition routine 11 is executed and the subsequent waiting stage 12 initiated.

Figure 11:
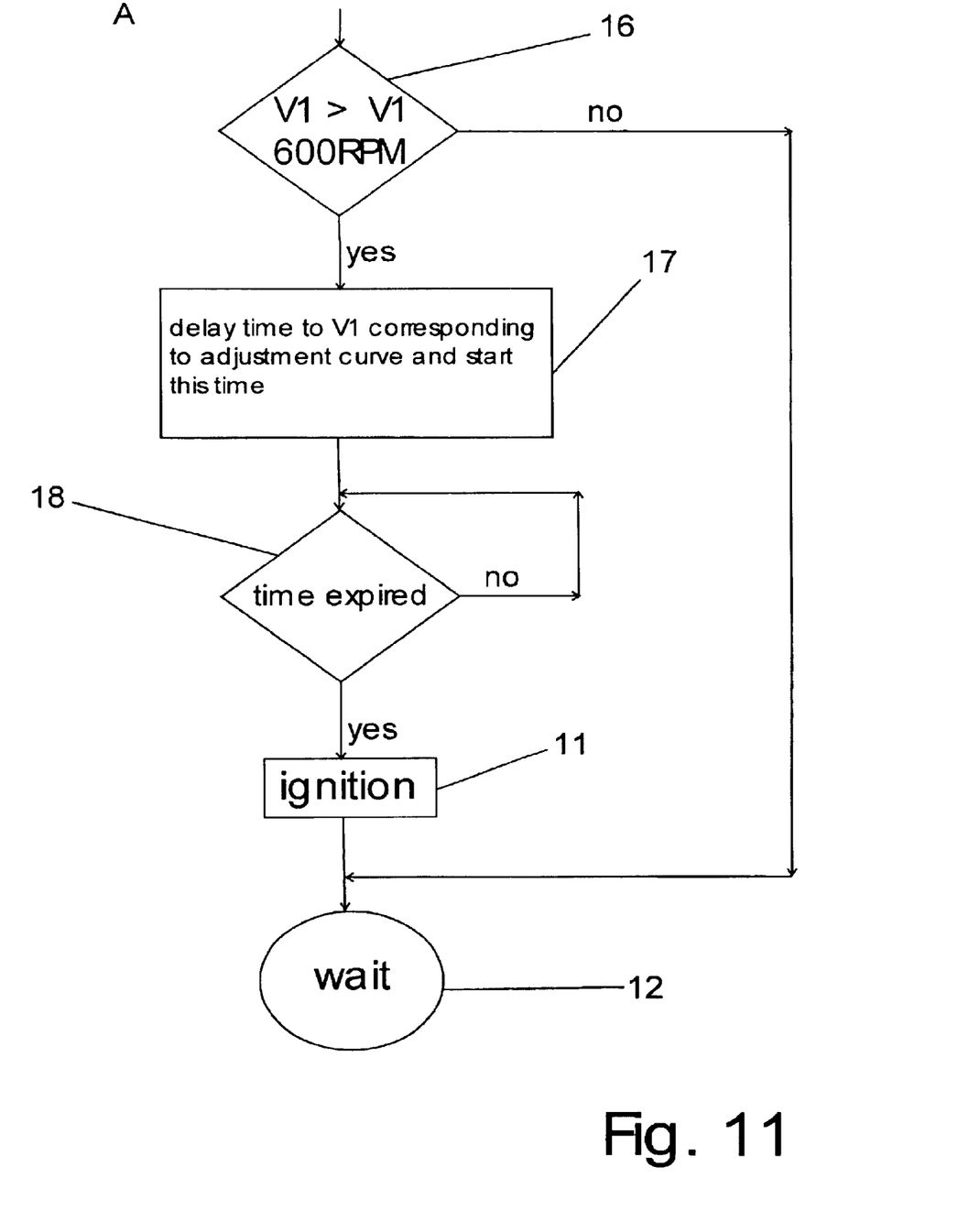

In the alternative program branches according to FIGS. 11 and 12 for the ignition timing in the start rotation speed range, in each case as a function of the momentary angular velocity, from the peak voltage of the first half-wave I the ignition timing is established in accordance with the adjustment curve in FIG. 3. From the time or angle position T3, according to FIG. 11, on expiry of a specific delay time the ignition is triggered. The delay time can be taken from a table "delay time over peak voltage or amplitude" (FIG. 11, program element 17). According to FIG. 12 from the time or angle position T3 the ignition is triggered on undershoot of threshold V_sch_ZZP. Within the microcontroller MC this information can be taken from a stored table "threshold over peak voltage or amplitude".

Figure 13:
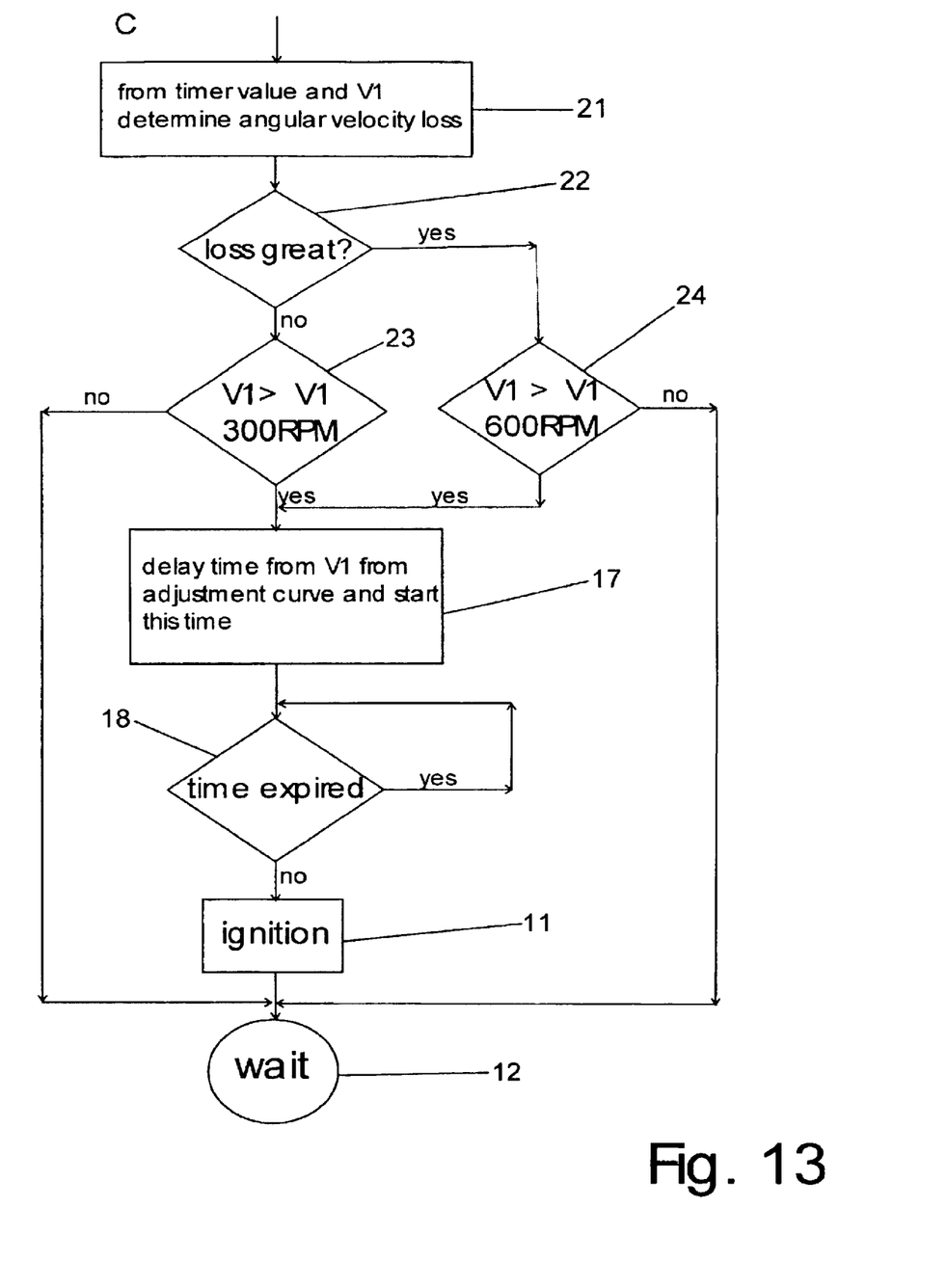

The alternative according to FIG. 13 is essentially based on that in FIG. 11 but in addition it is checked whether a decompression valve is activated. For this the extent of the angular velocity loss in the area immediately before top dead centre OT is analysed. This can be achieved in one embodiment of the invention via the formation of the ratio of momentary angular velocity W to the said mean angular velocity RPM. However the problem arises that this ratio approaches one as the rotation speed increases. To remedy this in a particular embodiment it is proposed to store in the memory of the microcontroller a table for this ratio which has adequate resolution even in the higher rotation speed range to allow reliable and safe recognition of an angular velocity loss specific to an active decompression valve.

According to FIG. 13 the algorithm to detect the angular velocity loss is performed with a detection routine in the sequential program element 21. If the loss does not comprise a prespecified intensity or extent, according to program branch 22 it is checked whether the momentary angular velocity has exceeded at least one switch-on threshold of for example 300 revolutions per minute (program branch 23). If so, the software routines 17, 18, 11, 12 already explained above with reference to FIG. 11 are executed in the order listed. If the momentary angular velocity does not exceed the switch-on threshold of 300 revolutions per minute, ignition is omitted and waiting mode 12 initiated. If according to a scan with program branch 22 the angular velocity loss reaches a prespecified intensity or extent, for example to one quarter of the angular velocity at the bottom dead centre, a non-activated decompression valve or its absence is concluded. Consequently a higher switch-on threshold of for example 600 revolutions per minute is required, as can be shown from program branch 24 in FIG. 13. If this higher switch-on threshold for operation without decompression valve is not reached, waiting mode 12 is initiated immediately otherwise the software routines according to program elements 17, 18, 11, 12 are likewise executed in that order.

With this ignition method according to the invention the switch-on threshold can be set to a momentary angular velocity of 600 revolutions per minute (operation without active decompression valve). For operation with an active decompression valve, the result of which is a smaller angular velocity loss in the area before top dead centre, even at a momentary angular velocity of 300 revolutions per minute an ignition event can be triggered without a significant risk of kickback. In comparison according to the prior art, with combustion engines with high compression and low flywheel mass it is necessary to set the switch-on threshold to a mean angular velocity of 1200 revolutions per minute in order to achieve a kickback tendency which is just acceptable. To avoid kickback with maximum safety, in the prior art the switch-on threshold would have to be set to a mean angular velocity of 1800 revolutions per minute. In general the switch-on threshold or release of an ignition signal is dependent on reaching a particular rotation speed of the crankshaft or magnet wheel so that sufficient mechanical rotary energy is stored to pass beyond the piston top dead centre.

REFERENCE LIST

P01 Magnet wheel
MA1 Permanent magnet
N, S Magnetic poles
K1 Pole shoe
Z1 Ignition module
L1–L4 Coils
K2 Iron core
L1 Charge coil
V_L1 Voltage
G1 Bridge rectifier
C1 Capacitor
UC Capacitor voltage
MC Microcontroller
L2 Primary coil
L2, L3 Ignition transmitters
FU Ignition spark
Z Ignition flank
L3 Secondary coil
S1 Switch element
U4 Rectifier
I, II, III Half-waves
V_L1a Alternating voltage signal
V_L1b Alternating voltage signal
U3 Differential element
RPM Mean angular velocity
OT Top dead centre
d Angular velocity loss
DECO Decompression valve
UT Bottom dead centre
b Greater angular velocity loss
e Swing back
a Angular velocity loss
f Combustion without kickback
c Combustion with kickback
T3 Rotary angle position
V1 Peak voltage
W Momentary angular velocity
U1, U2 Analog-digital converters
U1 Digital-analog converter
U2 Comparator
1 Sequential program element
2 Program branch
V_sch_1 Threshold level
3 Program branch
T1–T3 Rotary angle
4 Counter program element
5, 6 Program branch
7 Sequential program element
8 Program branch
9 Sequential program element
10 Program branch
11 Sequential program element (ignition routine)
12 Waiting state
13 Program branch
14 Sequential program element
15 Program branch
16 Program branch
17 Sequential program element
18 Program branch
19 Sequential program element
V_sch_ZZP Threshold
20 Program branch
V1 Peak voltage of first half-wave I
21 Sequential program element
22, 23, 24 Program branch
V1 Amplitude or peak value
V_sch_ZZP Ignition switch threshold
ZW Advance angle
ZZP Ignition timing

What is claimed is:

1. A process for rotation speed-dependent control and/or diagnosis of a two- or four-stroke combustion engine, in particular of its ignition or load state, using a rotary generator (P01) which rotates in synchrony with the combustion engine and depending on engine rotary position (T1–T3) and speed generates alternating voltages (I–III) which are scanned by a preferably programmable control (MC) and used for its power supply, where the peak value (V1) of the alternating voltage half waves correspond to a rotation speed of the combustion engine, wherein the control (MC) detects the amount peak value (V1) of at least one of the half waves (I, II, III) occurring per engine revolution and depending on the peak value calculates a control or diagnosis value, sets one or more control or diagnosis flags and/or triggers a control event in the control and/or a diagnosis or control output signal, in particular an ignition signal and/or load information signal.

2. The process as claimed in claim 1, wherein the half wave peak value (V1) is processed into a momentary angular velocity value (W) depending on which a control value is calculated and/or a control event in the control and/or a control output signal, in particular an ignition signal, are triggered.

3. The process as claimed in claim 2, wherein to determine the momentary angular velocity a functional in particular linear correlation is applied between this momentary angular velocity and the peak value (VI).

4. The process as claimed in claim 1, wherein a coupling of the magnet generator (P01) with revolutions of the combustion engine is set with angular geometry such that during a compression stroke of the combustion engine at least one of the half waves of the alternating voltage (I, II, III) occurs before piston top dead center (OT), the peak value (V1) of said half waves then being detected by the control (MC).

5. The process as claimed in claim 4, and further comprising dimensioning of the angular geometric coupling of the magnet generator (P01) with revolutions of the combustion engine such that the or at least one of the alternating voltage half waves (I, II, III) occurs at a rotary angle range between 20 and 5 degrees, preferably 10 to 15 degrees before top dead center (OT).

6. The process according to claim 1, wherein within each engine revolution a mean angular velocity (RPM) is determined by measurement of a period required for the combustion engine to pass through a predetermined reference rotary angle (T2–T1), and the triggering or release of the control event and/or control signal, in particular ignition signal, as a function of the momentary angular velocity (W) and/or the corresponding half wave peak value (V1) is made dependent on whether the mean angular velocity (RPM) lies within a predetermined start rotation speed range below a working and/or idle rotation speed range.

7. The process as claimed in claim 6, wherein the reference rotary angle (T2–T1) corresponds to an engine revolution of at least 150 degrees.

8. The process as claimed in claim 6 or 7, wherein the mean angular velocity (RPM) and the momentary angular velocity (W) are compared and depending on whether the resulting comparison amount overshoots or undershoots one or more predetermined threshold values, one or more flags in the control for any control event and/or signal and/or information output are set accordingly.

9. The process as claimed in claim 6 or 7, wherein in the control a ratio amount is calculated from the mean and momentary angular velocities (W) and using a ratio control table previously stored in the control, a decision is made on the setting of one or more flags in the control for any control event or signal and/or information output.

10. The process as claimed in claim 8, wherein the flag or flags and/or the comparison or ratio amounts are evaluated or weighted or filtered used to detect and distinguish a compression stroke from other strokes or status phases of the combustion engine.

11. The process as claimed in claim 10, after detection and distinction by means of counting engine revolutions (360 degrees) by the control, a corresponding engine revolution or engine rotary section is allocated to a compression stroke, in particular for ignition timing adjustment purposes.

12. The process as claimed in claim 11 with a four-stroke combustion engine, wherein the flag or flags and/or the comparison or ratio amounts arc evaluated or weighted or filtered to distinguish a compression stroke from an exhaust stroke of the combustion engine and then exclusively in the compression stroke an ignition event and/or signal is triggered.

13. The process as claimed in claim 8, wherein the flag or flags and/or the comparison or ratio amounts are weighted or evaluated or filtered to detect an extent of volume or load with combustion mixture in a cylinder of the combustion engine, and the corresponding information is used in the control for loud-dependent ignition timing adjustment and/or selection between different rotation speed/advance angle curves and/or for load-dependent triggering of actors such as valves in carburetors to influence the mixture.

14. The process as claimed in claim 13 with a four-stroke combustion engine, wherein the peak values of the alternating voltage half waves (I, II, III) occurring in two successive engine revolutions (360 degrees) in rotary and/or stroke positions of the combustion engine with the same angular geometric cover are compared to obtain loud information.

15. The process as claimed in claim 14, wherein to two rotary and/or stroke positions correspond to an exhaust stroke and a subsequent working stroke.

16. The process as claimed in claim 2, 3, 4, or 5, wherein within each engine revolution (360 degrees) a mean angular velocity (RPM) is determined by measurement of a duration required for the combustion engine to pass through a predetermined reference rotary angle (T2–T1), and from the peak value of an alternating voltage half wave (II, III) occurring after the compression stroke a second momentary angular velocity value is obtained within the respective engine revolution which is linked or processed with the mean angular velocity (RPM) to farm a correction value for the first momentary angular velocity.

17. The process as claimed in claim 4 or 5, wherein in the control (MC) a rotary angle value (ZW) or a delay time for a temporal advance or retardation of the ignition timing is determined in relation to the engine rotary position (T1–T3) as a predetermined function of the first said momentary angular velocity value and/or half wave peak value, and the ignition signal is output at a correspondingly set time and/or engine rotary position (Z).

18. The process as claimed in claim 17, wherein in a rotation speed start range below another working or idle rotation speed range, the earliest ignition timing is made dependent on the occurrence of a first half-wave of the alternating voltage (I–III).

19. The process as claimed in claim 17, wherein below a predetermined threshold (n_St) for the first said momentary angular velocity value and/or half wave peak value, ignition (FU) is prevented and/or not triggered.

20. The process as claimed in claim 17, wherein to determine the rotary angle value of the advance or retardation, a curve stored in the control is used with an advance angle (ZW) or a corresponding delay time over the detected momentary angular velocity and/or half wave peak value (V1).

21. The process as claimed in claim 17, wherein to determine the rotary angle value and/or delay time of the advance or retardation, a curve stored in the control is used with a variable ignition switch threshold (V_sch_ZZP) as a function of the momentary angular velocity detected and/or the corresponding half wave peak value (V1), and the falling flank of the alternating voltage half wave (I, VI) detected is checked for overshoot or undershoot of the respective ignition switch threshold (V_sch_ZZP) and in such a case an ignition event (11; FU) is triggered.

22. The process as claimed in claim 8 with a cylinder decompression valve (DECO) to reduce the cylinder internal pressure during the compression stroke, wherein the flag or flags and/or the comparison or ratio amounts in relation to the mean and the first said momentary angular velocity (RPM, W) are used to detect the undershoot of a relative loss threshold for the angular velocity and in such a case the first said momentary angular velocity value (W) or corresponding half wave peak value (V1) is compared with the value for a first absolute angular velocity threshold (24) below an idle rotation speed range, and depending on the undershoot or overshoot an ignition signal (11) is output or excluded, and in the case of overshooting the relative loss threshold, the first said momentary angular velocity value (W) or the corresponding half wave peak value (VI) is compared with a value for a second absolute angular velocity threshold (23) below the first, and depending on the overshoot or undershoot an ignition signal (11) is released or excluded.

23. The process as claimed in claim 22, wherein in the case of overshoot of the first or second angular velocity threshold (24, 23), the output of the ignition signal (11) takes place delayed by a time (17) or rotary angle which corresponds to an angle value (ZW) stored in the control or corresponding ignition switch threshold (V_sch_ZZP) for a temporal advance or retardation of the ignition timing (ZZP) in relation to the engine rotary position, wherein the angle value or ignition switch threshold is a predetermined function of the momentary angular velocity value (W) and/or corresponding half wave peak value (V1).

24. The process as claimed in claim 4 or 5, wherein when the peak value of the detected alternating voltage half wave (V1) corresponds to an idle rotation speed range (15) predetermined for the combustion engine, an ignition signal (11) is immediately triggered.

25. The process as claimed in claims 4 or 5 or 6, wherein when the mean angular velocity (RPM) falls in a predetermined idle rotation speed range (15), on detection of the peak value (V1) of the alternating voltage half wave an ignition event (FU) is triggered and/or an ignition signal (11) is output immediately.

26. A control and/or diagnosis apparatus having a magnet generator (P01) which is rotatable in synchrony with revolutions (360 degrees) of the combustion engine and is inductively connected with one or more coils (L1–L4) and generates therein alternating voltages (I, II, III) depending on the engine rotation speed (W, RPM) and rotary position (T1, T3, T2), and with having a digital electronic preferably programmable control (MC) which is connected for its power supply with the one or more coils (L1–L4) via a scanning device (V_L1a, U2, U1) and has one or more output interfaces for control and/or diagnosis signals and/or information, wherein the scanning device (V_L1a, U2, U1) is formed with an analog-digital converter (U1, U2) to detect peak values (V1) of alternating voltage half waves, and the converter output is coupled with one or more modules of the control (MC) for filtration, evaluation, analysis and/or other processing of the respective alternating voltage half wave peak values (V1), and these modules are implemented in the control for information technology communication with the one or more output interfaces.

27. The apparatus as claimed in claim 26, wherein the analog-digital converter (U1, U2) is implemented with a digital-analog converter (U1) controlled by the control (MC) and a threshold value comparator (U2), the first analog input of which is connected with the output of the digital-analog converter (U1) to set a reference voltage for a threshold value by the control (MC), the second analog input of which is coupled with at least one coil (L1) to detect an amplitude peak value (V1), and the binary output of which is supplied to an input of the control (MC) to signal the threshold value decision.

28. The apparatus as claimed in claim 27, wherein the digital-analog converter (U1) and the threshold value comparator (U2) are integrated in the control (MC).

29. The apparatus as claimed in claim 26, 27 or 28, wherein the control (MC) is also connected with the coil (L1) from which is supplied the alternating voltage (I, II, III) to the analog-digital converter (U1, U2) via a differential element (U3), which is connected on the output side with control means (MC) to detect and evaluate a time-rotary angle relation of the scanned alternating voltage amplitudes (V1; I, II, III).

30. The apparatus as claimed in claim 26, 27 or 28, and further comprising calculator means contained in the control (MC) for comparison of the amounts of several successive scanned values for the purpose of establishing the greatest scanned value (VI).

31. The apparatus as claimed in claim 26, 27 or 28, wherein the control (MC) has an ignition trigger output connected with an ignition switch (S1) which is ranged for discharging via the primary coil (L2) of an ignition transmitter (L2, L3) the energy storage element (C1) charged with the alternating voltages (I, II, III).

* * * * *